Aug. 24, 1943. G. T. JACOCKS 2,327,716
CLOSURE
Filed Feb. 11, 1941 2 Sheets-Sheet 1
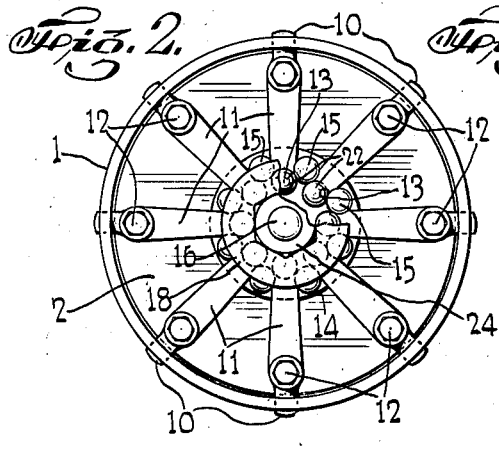
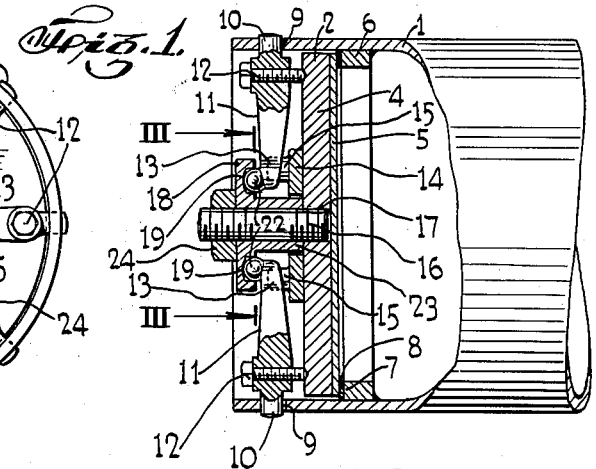
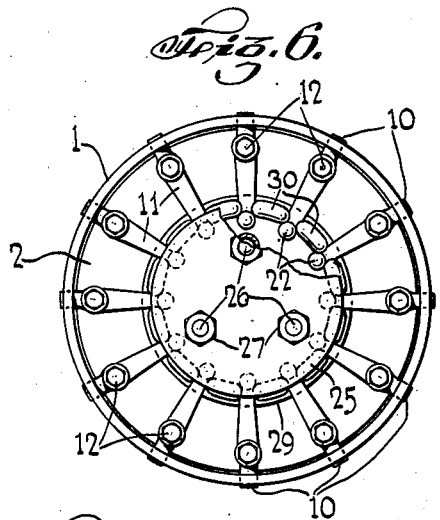
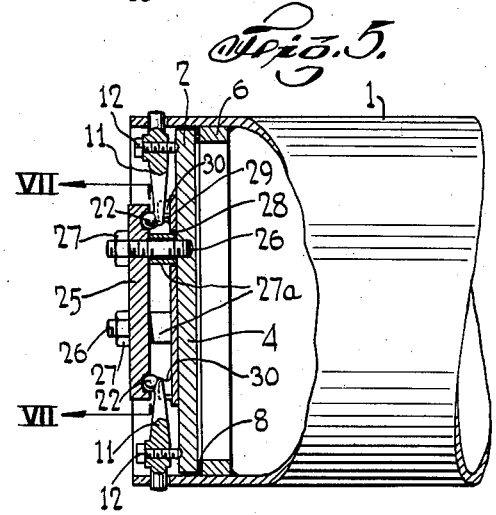
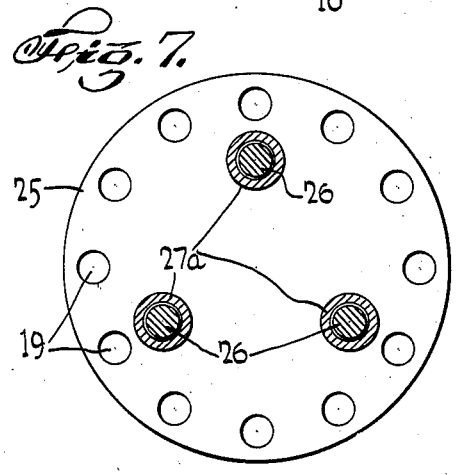
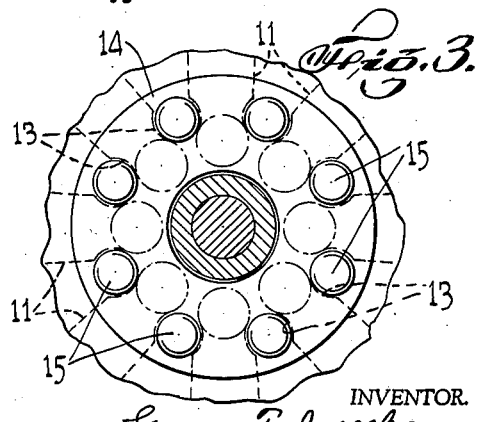
INVENTOR.
George T. Jacocks
BY Lyman E. Dodge
ATTORNEY Aug. 24, 1943.　　　G. T. JACOCKS　　　2,327,716
CLOSURE
Filed Feb. 11, 1941　　　2 Sheets-Sheet 2

INVENTOR
George T. Jacocks
BY Lyman E. Dodge
ATTORNEY

Patented Aug. 24, 1943

2,327,716

UNITED STATES PATENT OFFICE 2,327,716

CLOSURE

George T. Jacocks, New Rochelle, N. Y., assignor to Heat Transfer Products, Inc., New York, N. Y., a corporation of New York Application February 11, 1941, Serial No. 378,385

3 Claims. (Cl. 220—57)

This invention relates to closures, especially closures for vessels subjected to internal pressure and more particularly to heat interchange or transfer devices.

A principal object of this invention is the production of a device of the type specified which will be inexpensive to manufacture, easy to assemble, install and maintain, and certain and efficient in function.

A further object of the invention is the production of a device of the type specified which will be so constructed that users thereof will be provided with means for avoiding the application of undue pressure thereto.

A further object of the invention is the production of a device of the type specified which will be adapted for use with a positioning means which in turn will facilitate the proper employment of the device.

Other objects and advantages will appear as the description of the invention and the particular physical embodiments selected to illustrate the invention progresses and the novel features will be particularly pointed out in the appended claims.

Figure 4:
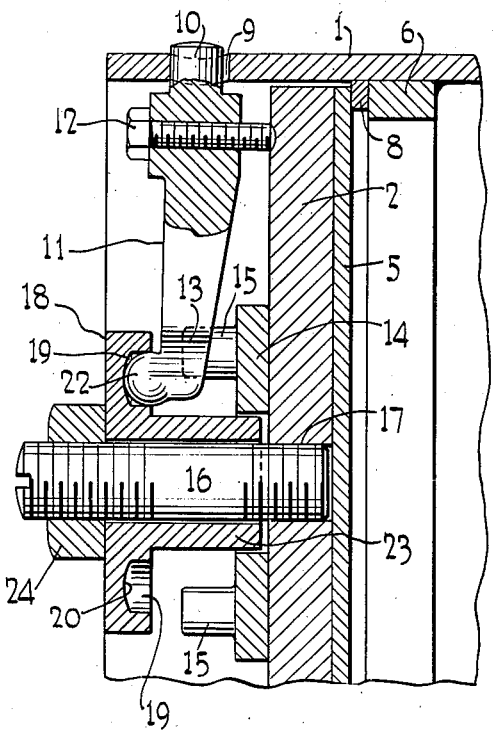
Figure 9:
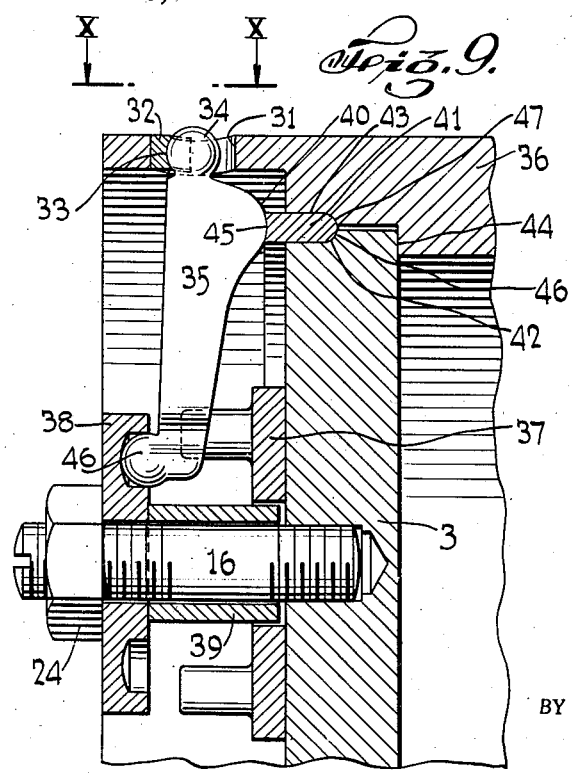
Figure 8:
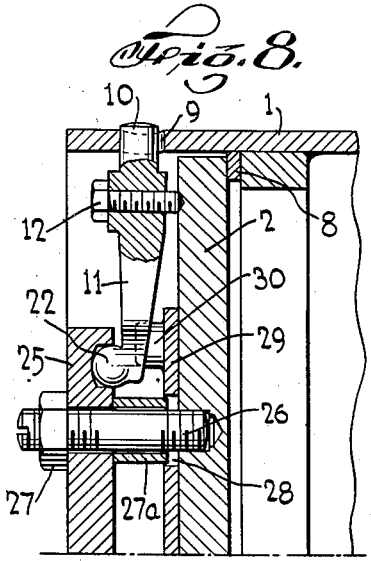
Figure 10:
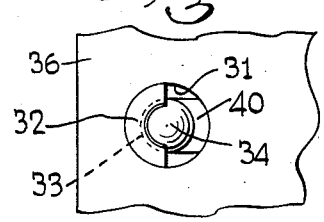

In describing the invention in detail and the particular physical embodiments selected to illustrate the invention, reference will be had to the accompanying drawings and the several views thereon, in which like characters of reference designate like parts throughout the several views, and in which:

Figure 1 is a fragmentary part side elevation and part cross-sectional view of a device embodying the invention; Fig. 2 is an end view of the device as shown by Fig. 1; Fig. 3 is a cross-sectional view of the device as shown by Fig. 1 on the plane indicated by the line III—III of Fig. 1 viewed in the direction of the arrows at the ends of the line; Fig. 4 is a fragmentary enlarged detail view similar to Fig. 1 but with sme parts omitted in order to more clearly show the construction; Fig. 5 is a partly side elevational and partly cross-sectional view of a modified form of the device as shown by Fig. 1; Fig. 6 is an end view of the device as shown by Fig. 5; Fig. 7 is a cross-sectional view on the plane indicated by the line VII—VII of Fig. 5, viewed in the direction of the arrows at the ends of the line; Fig. 8 is a fragmentary enlarged view of the device as shown by Fig. 5 with parts omitted in order to more clearly show the construction; Fig. 9 is a fragmentary view similar to Figs. 1 and 5 illustrating the construction of a modified form of the device; Fig. 10 is a fragmentary view of a portion of the device as shown in Fig. 9 as seen from above.

In each of the views, numeral 1 designates a vessel. This vessel is contemplated as being hollow and preferably circular in cross-section although applicant's invention is equally applicable to a vessel of any shaped cross-section. The vessel 1 is illustrative of the outer or containing vessel as commonly used for heat transfer devices or heat interchange devices as commonly used for water cooling and petroleum distillate condensation and similar and analogous purposes such as condensers and gas coolers.

Vessels such as 1, used for the purposes hereinbefore mentioned are provided with a closure or head for retaining the gaseous or fluid contents of the vessel therein. The head shown is, like the vessel, merely conventional and has been designated as 2 in all of the figures with the exception of Fig. 9 in which it has been designated as 3 because in that figure the head is of slightly different form. The head 2 is formed of any suitable or appropriate material, generally steel or phosphor bronze or it may be, as shown in Fig. 1, formed of steel 4 with a covering 5 of dissimilar and of proper corrosion resistant metal on the surface thereof exposed to the contents of the vessel 1.

In whatever form the closure or head 2 is made, it must make a fluidtight connection with the vessel 1. In order to illustrate this, applicant has shown a conventional form of connection by illustrating, in all of the figures except 9, a ring 6 formed integral with or formed separately and intimately attached to the vessel 1 thereby providing a shoulder or abutment for head 2 to abut and preferably arranged for the reception of a packing means 8 which would preferably be in the form of a gasket. This gasket can be made of any of the well known suitable and appropriate materials taking into consideration the amount of pressure which would exist in the vessel 1. It might well be made of vegetable fibres, or mineral fibres, or even of a somewhat soft and malleable metal.

It may well be considered that all of the parts of the devices already described are of usual, conventional or ordinary form, as applicant's invention relates particularly to the means for pressing or forcing the closure or head 2 forcibly against the integral or separate shoulder 7 of the vessel 1.

In Figure 1 applicant has shown a plurality of orifices 9 formed through material integral with or connected to the vessel 1. These orifices would preferably be circular and formed in the material of the vessel 1 by any suitable or appropriate means as by punching or drilling. There may be two orifices or any plurality thereof. They serve, as will be hereinafter fully explained, to cause the wall of the vessel to act as a stress resisting member.

Into each of the orifices 9 is positioned an end 10 of a closure lever 11. The end 10, in the views 1 to 8 inclusive, is circular in transverse section to accord with the orifice 9 and fits somewhat loosely therein, that is, fits so loosely that a considerable motion transverse to the longitudinal axis of the lever 11 may be had without causing binding of the end of the lever 11 upon diagonally opposite edges of the orifice 9.

Closure lever 11 is provided with a head bearing portion. This head bearing portion is preferably not made integral with the lever 11 but is formed as a separate part which may be adjusted and is designated 12. It is in the form of a headed screw, screw threaded into the lever 11 and so capable of adjustment transversely to the longitudinal axis of the lever 11.

Each of the levers 11, as best shown in Fig. 2, is provided with a keeper receiving portion 13. This keeper receiving portion may be made in various forms but is preferably in the form of a reduced portion, as shown, so that it may be positioned between upstanding portions of a keeper.

The keeper or positioning member is designated as a whole as 14. This keeper provides means for embracing the reduced portion 13 of the lever 11. Various forms of grasping or supporting means may be formed upon the keeper 14 but it is preferred to have, in effect, a U as a supporting means, and it is further preferred to make each leg of the U do double duty so that there is in effect one U leg between each two levers 11. This form is best produced by producing a plurality of pins 15 upstanding from the base of the keeper 14. By this construction each of the levers 11 may be positioned in an orifice, as 9, and the other end of each of the levers would be positioned between adjacent pins, as 15, as clearly shown in Fig. 2. With such an assembly, levers 11 with the keeper 14 may be positioned as shown in Figs. 1 and 2 and all parts will remain in place with the members 12 bearing against the outside surface of the head 2, preliminary to applying force to the levers.

In order to apply force to the levers 11 and to exert pressure against the head 2, means preferably taking the form of a stud 16 are provided. This stud 16 is secured to the head 2, or adjacent the geometrical center thereof, in any suitable or appropriate manner as by screw threading the same into a screw threaded orifice 17 of the head 2. After the stud 16 has been positioned a screw threaded member may be screwed thereon to contact with the inner end of each of the levers to force the inner end toward the head 2 and so cause pressure to be applied through member 12 to the head 2 adjacent its periphery or adjacent the shoulder or abutment 6 to cause the head 2 to make a fluid tight joint at the shoulder 7. The preferred construction, however, is to first place a washer 18 in position on the inner ends of each of the levers 11 and then force the washer by means of a member screwed on to the stud 16. This washer 18 is preferably centralized by closely embracing the stud 16 and is preferably formed with depressions, as 19, receiving the out-turned ends of the levers 11.

The washer 18 is preferably formed with a depression 19 which has a surface on the bottom 20 which is formed as a portion of a sphere or an ellipsoid and the end 22 of the lever 11 is preferably upturned and formed with a spherical or ellipsoidal surface.

By the construction described, a closure is formed which includes a head 2 which may be pressed or forced down by stressing the vessel wall, against a shoulder, as 7, with practically any pressure within the limit of strength of the material used. At any rate, it may be held so tightly against the shoulder 7 that no possibility of leakage at that point can occur. Suitable adjustment may easily be made by means of the headed screw 12. It is preferred to provide for unskilled assembly, and to that end, the device as illustrated and described, in assembling and testing at the factory by skilled workers would be adjusted so that the head would be forced against the shoulder 7 with just the proper pressure to provide for the particular use to which the device was to be put and the pressure holding head 2 against the shoulder 7 would be limited to a limit device. This limit device could be made in various forms but with the form of device as shown in Figs. 1 and 2 it is preferred to make the limit device a portion of the washer 18 and to make this limit device in the form of a sleeve 23 surrounding stud 16. This limit device 23 would be adjusted to the proper length by the skilled workers at the factory so that just the proper pressure could be applied to head 2 whereupon the limit sleeve 23 would directly take up the application of force as applied by screwing on screw threaded member 24. The sleeve 23, of course, could be made as a member separate from the washer 18 but it is preferred to form it as a skirt or extension of the washer 18. It is in effect an incompressible body interposed directly between head 2 and screw threaded member 24.

In Figs. 5, 6, and 7 a modified form of applicant's lever lock device is shown. In this form, the levers 11 are built in substantially the same form as those shown in Figs. 1 and 2 but in the form as shown in Figs. 5, 6, and 7 a compression plate 25 is employed which is forced toward the head 2 not by the use of one stud as 16 but by the use of a plurality of studs as 26 and in the case shown there are three studs. Each of the studs 26 is attached to the head 2 in any suitable or appropriate manner as by screw threading therein and each receives a threaded member as 27 which upon being screwed thereon forces the compression plate 25 and the levers 11 toward the head 2.

In the form as shown by Figs. 5, 6 and 7 there can be no unequal pressure caused about the edge or periphery of head 2 because as compression plate 25 is freely movable upon the studs in a direction to and from the head 2, the tightening of any one screw threaded member 27 will cause an equal distribution of pressure at each of the studs and so upon each of the levers 11.

In the form as shown by Figs. 5, 6 and 7 the means used to limit the amount of pressure which an unskilled person may apply to the head 2 takes the form of incompressible members positioned closely adjacent each stud and are preferably in the form of sleeves, as 27a, each embracing a stud, as 26 and positioned between the head 2 and the compression plate 25 there being an orifice 28 through the keeper 29 to allow the passage of the limit sleeve 27a. Each of these limit sleeves 27a is suitably adjusted as to length at the factory at the time of assembly by skilled workmen.

In the form as shown by 5, 6 and 7, the keeper 29, although of substantially the same form as that shown by Figs. 1 and 2, is slightly different in that the pins 30 corresponding to the pins 15 of Fig. 2 are not shown as exactly circular in form but are rectangles with rounded ends and the keeper 29 instead of surrounding a central stud as 16 is provided with a plurality of orifices as 28, so as to receive each of the studs as 26.

In Fig. 9 a modification of the device as shown by Figs. 1 and 2 is shown, in that the orifice 31 corresponding to orifice 9 of Fig. 1 through the wall of the vessel 36 corresponding to the vessel 1 of Figs. 1 and 2 is provided with a segment 32 of a ring. This segment is preferably of about one half a complete ring and is formed with an inner face 33 which is spherical or ellipsoidal. Cooperating with the inner surface of the ring is a correspondingly formed head 34 of a lever 35 corresponding to the lever 11 of Fig. 1.

The lever 35 of Fig. 9 is positioned and held in position by a keeper 37 corresponding to the keeper 14 of Figs. 1 and 2 and is forced toward the head 3 by the stud 16 and a screw threaded member 24 just as in Figs. 1 and 2. In Fig. 9, however, the washer bearing against the inner end of the lever 35 and designated 38 is made separate from the limit sleeve 39.

The lever 35 has an integral protuberance or bulge 40 which bears against a ring key 41 which fits into a rabbet 42 formed in the edge of the head 3 and also into a rabbet 43 formed in the wall 36 of the vessel.

When the lever 35 is forced toward the head 3 the protuberance 40 forces the ring key into the rabbets formed in the head 3 and the vessel wall 36 and forces the head 3 against the shoulder 44 of the vessel wall so that a fluid tight joint is formed at 44 and at 46 and 47, and all parts are free from binding because the protuberance 40 may move relatively to 43 as the interengaging surfaces at 45 are made spherical or ellipsoidal and the end 34 of the lever 35 engages a like surface on the inside of the ring 32 and the head 46 of the lever 35 engages a similar surface in the washer 38.

From the above description it will be seen that applicant has designed and produced a closure which is adapted to secure a head, as 2, absolutely fluid tight against the wall of a vessel, as 1, or a head, as 3 against the wall of a vessel, as 36, and that this fluid tight connection may be made tight by an unskilled workman after the necessary adjustments have been made by a skilled workman without exerting undue pressure by reason of the use of limit devices such as 23 and 39.

Although I have particularly described several particular embodiments of my invention and explained the operation, construction and principle thereof, nevertheless I desire to have it understood that the forms selected are merely illustrative but do not exhaust the possible physical embodiments of the idea of means underlying my invention.

What I claim as new and desire to secure by Letters Patent of the United States is:

1. A closure for a hollow vessel of the type wherein an abutment for a head is provided on the vessel and the vessel side wall, formed with an orifice, and serving as a stress member in forcing the head against the abutment, the combination of a plurality of levers disposed radially of the head, each lever being formed with a substantially convex spherical surface on its outer end, ring segments, each formed on the inner surface with a spherical concavity, one positioned in each orifice of the sidewall and serving to transmit stress on the levers to the vessel wall, the outer end of each lever cooperating with a ring segment, an intermediate portion of the lever cooperating with the head in compression adjacent the abutment and the inner end of the lever cooperating with the head in tension adjacent its geometrical center.

2. A closure for a hollow vessel of the type wherein an abutment for a head is provided on the vessel and the vessel sidewall, formed with orifices, serves as a stress member in forcing the head against the abutment, the combination of a plurality of levers disposed radially of the head, each lever being formed with a substantially convex spherical surface on its outer end and a convex protuberance at a position intermediate the ends, ring segments, each formed on the inner surface with a substantially spherical concavity, one positioned in each orifice of the vessel and serving to transmit stress on the levers to the vessel wall, the outer end of each lever cooperating with a ring segment, means bearing against the head and provided with a substantially concave spherical surface cooperating with all of the levers at an intermediate spherical surface in compression to cause the head to be forced against the abutment and the inner end of each lever cooperating with the head in tension adjacent its geometric center.

3. A closure for a hollow vessel of the type wherein an abutment for a head is provided on a vessel and the vessel sidewall, formed with orifices and serving as a stress member in forcing the head against the abutment, the combination of a plurality of levers disposed radially of the head, each lever having an outer end positioned in an orifice, the vessel and the head formed with mating rabbets, a ring key adapted to fit into the mating rabbets, said levers formed with an intermediate portion bearing on the ring key and means connected to the cover for forcing the inner end of each lever toward the head whereby the ring key forces the head toward the abutment.

GEORGE T. JACOCKS.